(12) United States Patent
Cassady et al.

(10) Patent No.: US 12,546,681 B2
(45) Date of Patent: Feb. 10, 2026

(54) CHANGEABLE TIP FOR OPTICAL FIBER INSPECTION DEVICE

(71) Applicant: VIAVI Solutions Inc., Chandler, AZ (US)

(72) Inventors: Kevin Cassady, Monroe, WA (US); Maciej Ziomkowski, Bothell, WA (US); Jay Gregory Brace, Lynnwood, WA (US); Andrew Parsons, Brier, WA (US); Alexis Anne Bartels-Popelar, Woodinville, WA (US)

(73) Assignee: VIAVI Solutions Inc., Chandler, AZ (US)

( * ) Notice: Subject to any disclaimer, the term of this patent is extended or adjusted under 35 U.S.C. 154(b) by 276 days.

(21) Appl. No.: 18/328,367

(22) Filed: Jun. 2, 2023

(65) Prior Publication Data
US 2024/0402041 A1 Dec. 5, 2024

(51) Int. Cl.
*G01M 11/00* (2006.01)
*G02B 21/00* (2006.01)
*G02B 21/36* (2006.01)
*H04N 23/50* (2023.01)

(52) U.S. Cl.
CPC ......... *G01M 11/30* (2013.01); *G02B 21/0008* (2013.01); *G02B 21/362* (2013.01); *H04N 23/555* (2023.01)

(58) Field of Classification Search
CPC .... G01M 11/30; G01M 11/088; G01M 11/31; G02B 21/0008; G02B 21/362; H04N 23/555
See application file for complete search history.

(56) References Cited

U.S. PATENT DOCUMENTS

| | | | |
|---|---|---|---|
| 2004/0118522 A1* | 6/2004 | Becher ................... | B25J 15/04 156/758 |
| 2010/0036278 A1* | 2/2010 | Rieth ................... | A61B 5/4337 600/551 |
| 2014/0288458 A1* | 9/2014 | Yoon ..................... | A61B 5/291 607/116 |
| 2015/0092043 A1* | 4/2015 | Baribault ............... | G01M 11/31 348/125 |
| 2016/0170151 A1* | 6/2016 | Baribault ............... | G02B 6/381 356/73.1 |
| 2016/0341904 A1* | 11/2016 | Morin-Drouin ...... | G02B 6/3628 |
| 2019/0391041 A1* | 12/2019 | Baribault ............. | G01M 11/088 |
| 2020/0379186 A1* | 12/2020 | Cassady ................ | G02B 6/385 |
| 2022/0035104 A1* | 2/2022 | Filion ................ | G02B 21/0008 |
| 2022/0074810 A1* | 3/2022 | L'Heureux ........ | G01M 11/0257 |

* cited by examiner

*Primary Examiner* — Sang H Nguyen
(74) *Attorney, Agent, or Firm* — Harrity & Harrity, LLP (57) ABSTRACT

In some implementations, a device may receive, from one or more programmable components disposed in a changeable tip of an imaging device, a signal indicating tip configuration information associated with the removable tip. The device may activate software that causes one or more processors to configure, based on the tip configuration information, at least one testing parameter associated with a test to inspect an image of an end face of an optical fiber for compliance with a set of criteria related to a condition of the end face of the optical fiber. The device may output a result of the test that indicates a compliance status associated with the set of criteria.

20 Claims, 5 Drawing Sheets

CHANGEABLE TIP FOR OPTICAL FIBER INSPECTION DEVICE

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like. In some cases, a microscope may be used to analyze optical fibers of an optical cable.

SUMMARY

In some implementations, a method includes receiving, from one or more programmable components disposed in a changeable tip of an imaging device, a signal indicating tip configuration information associated with the removable tip; configuring, based on the tip configuration information, at least one testing parameter associated with a test to inspect an image of an end face of an optical fiber for compliance with a set of criteria related to a condition of the end face of the optical fiber; and outputting a result of the test that indicates a compliance status associated with the set of criteria.

In some implementations, a device includes an opto-mechanical assembly comprising an imaging device configured to capture an image of an end face of an optical fiber within a field of view of the imaging device; a changeable tip removably coupled to the opto-mechanical assembly and having one or more programmable components disposed therein; one or more memories disposed in the opto-mechanical assembly; and one or more processors, disposed in the opto-mechanical assembly and communicatively coupled to the one or more memories, configured to: receive, from the one or more programmable components disposed in the changeable tip, a signal indicating tip configuration information associated with the changeable tip; configure, based on the tip configuration information, at least one testing parameter associated with a test to inspect the image of the end face of the optical fiber for compliance with a set of criteria related to a condition of the end face of the optical fiber; and output a result of the test that indicates a compliance status associated with the set of criteria.

In some implementations, a changeable tip of a microscope system for testing an end face of an optical fiber includes a tip housing having an optical fiber interface at a first end of the housing and configured to be coupled with the end face of the optical fiber and a device interface configured to be coupled with a tip connection interface of an opto-mechanical assembly of the microscope system; and one or more programmable components disposed within the tip housing and configured to provide, to the opto-mechanical assembly, a signal indicating tip configuration information associated with the changeable tip.

DETAILED DESCRIPTION

The following detailed description of example implementations refers to the accompanying drawings. The same reference numbers in different drawings may identify the same or similar elements. The techniques, principles, procedures, and methods described herein may be used with any sensor implemented in a device having a tip that interfaces with an object or medium to be analyzed, including but not limited to other optical sensors and spectral sensors.

A technician may use a device, such as a handheld optical fiber microscope, to inspect an end face of an optical fiber of an optical cable prior to connecting the optical cable to network equipment. For example, the optical fiber may be placed in a field of view of the device, and the device may capture images, live video, and/or the like, of an end face of the optical fiber so that the device (and/or another device) may analyze the images for dirt particles, dust particles, scratches, and/or other surface defects. The device may need to capture a high-quality image of the end face of the optical fiber in order to perform an accurate analysis of the end face. For example, in order to enable an accurate analysis of the end face, the end face should be centered and in focus in the image, and there should be sufficient lighting to ensure that any dirt particles, dust particles, scratches, fingerprints, debris, and/or other surface defects are able to be detected when the image of the end face is analyzed.

In some cases, an inspection tip may be designed to interface with an end face of an optical fiber having a particular type and/or configuration. That is, for example, a first inspection tip may have a first inspection tip type and a second inspection tip may have a second inspection tip type. The first inspection tip type may be designed for interfacing and/or inspecting an optical fiber having a first optical fiber type and the second inspection tip type may be designed for interfacing and/or inspecting an optical fiber having a second optical fiber type. The optical fiber type may refer to one or more characteristics of the optical fiber and/or the end face of the optical fiber. The one or more characteristics may include one or more dimensions, operating characteristics, and/or materials, among other examples. In some cases, to facilitate accurate measurements, the device (e.g., the handheld optical fiber microscope) can be configured in association with the inspection tip type of the inspection tip that is used. Configuration of the device may include manually adjusting any number of testing parameters based on the inspection tip type. The testing parameters may include, for example, a sampling rate, a magnification, a mirror position, a mirror orientation, an exposure time (associated with an imaging device), and/or a processing algorithm, among other examples. However, to make the adjustments, the user of the device must have information indicating the particular adjustments to be made and must spend time making the adjustments, which may lead to inefficient operation of the device.

Some implementations described herein relate to an imaging device (e.g., a handheld optical fiber microscope) having a changeable tip that includes one or more programmable components disposed therein. For example, in some aspects, the changeable tip may be one of a number of changeable tips, each configured in association with an optical fiber type and/or an end face of an optical fiber. The changeable tip may include one or more programmable components configured to provide a signal indicating tip configuration information associated with the changeable tip. In some aspects, the one or more programmable components may include a printed circuit board (PCB) and/or a programmable memory component, among other examples. The device may receive the tip configuration information and, in response, may configure, based on the tip configuration information, at least one testing parameter associated with a test to inspect an image of an end face of an optical fiber for compliance with a set of criteria related to a condition of the end face of the optical fiber.

In this way, changeable tip enables a technician or other user to quickly and easily change tips for testing optical fibers having different types and/or characteristics without dependence on an external source of information associated with the tip configuration and/or without the need for manual configuration by the technician or user. This enables efficient configuration in association with changeable tips so that the tips may be changed for use with different optical fibers. In this way, time for switching between a configuration for inspecting an optical fiber of one type and a configuration for inspecting an optical fiber of another type may be reduced. Similarly, time and effort for switching between a configuration for a first tip that has a first characteristic (e.g., a first optical path) and a second tip that has a second characteristic (e.g., a second optical path) may be reduced. This may improve a throughput of a technician with regard to a quantity of optical cables (of potentially different configurations) that the technician can inspect within a period of time, and/or the like.

Figure 1A:
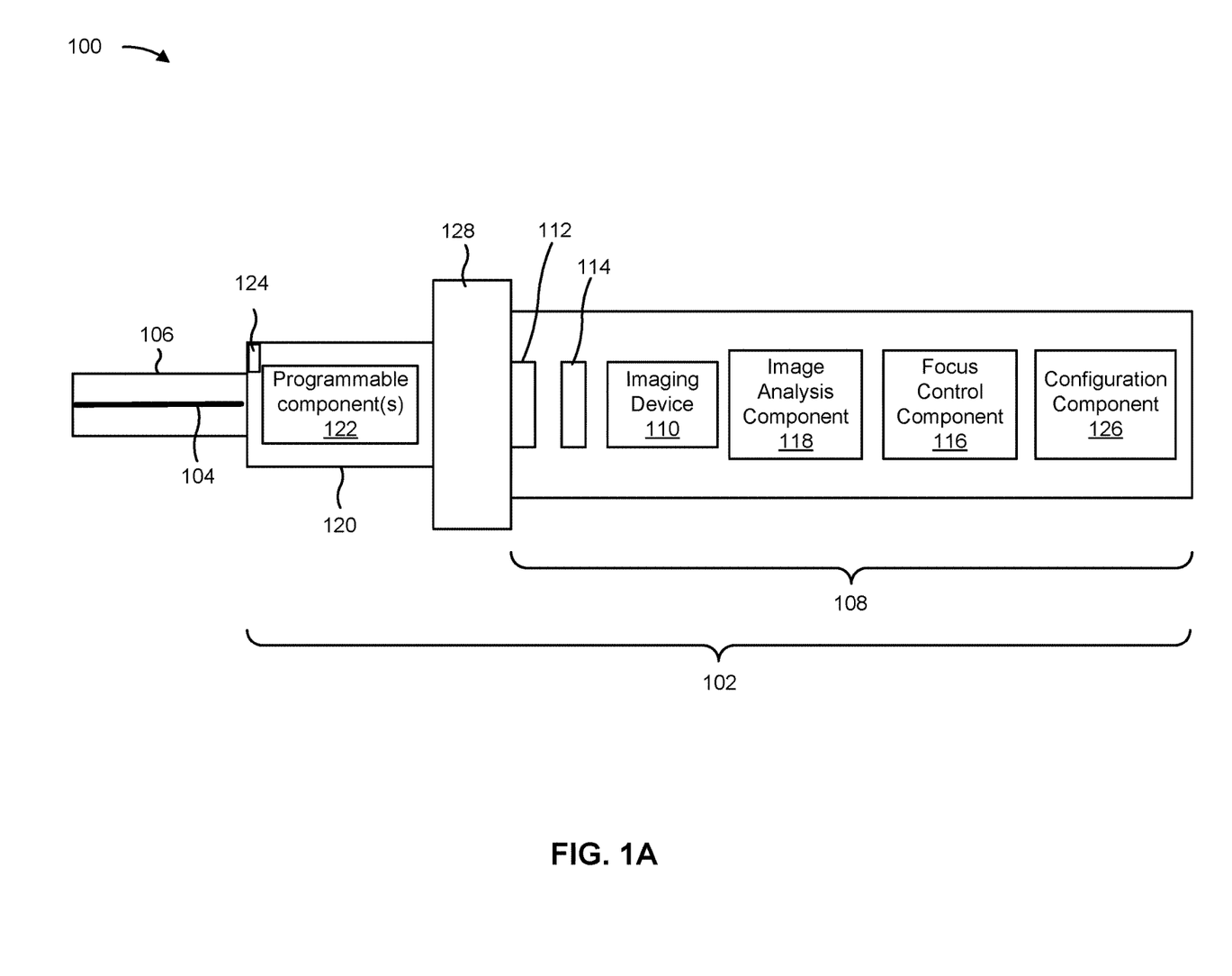
FIGS. 1A and 1B are diagrams of one or more example implementations described herein.
Figure 1B:
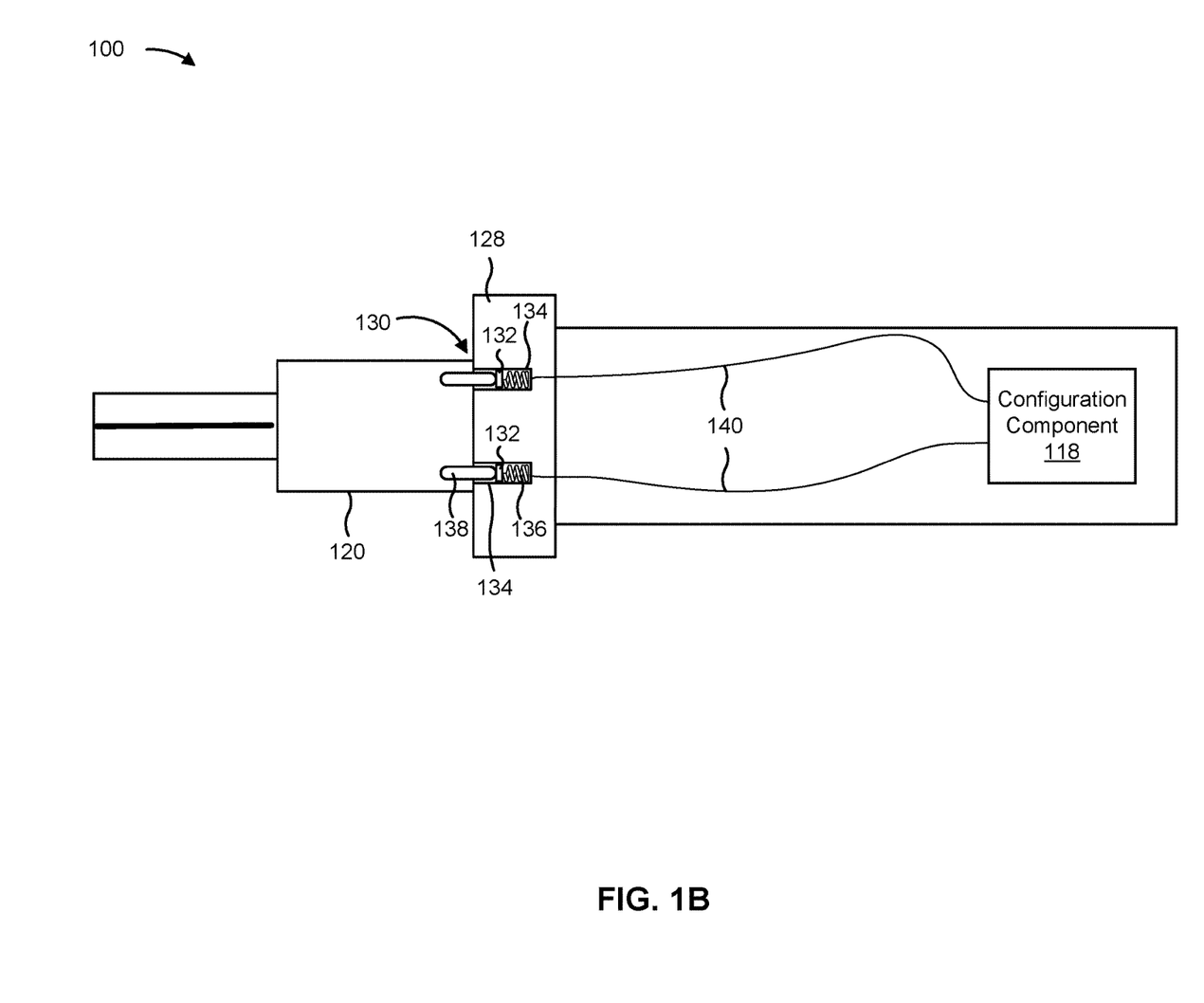

FIGS. 1A and 1B are diagrams of one or more example implementations 100 described herein. As shown in FIG. 1A, example implementation(s) 100 may include a device 102 (e.g., a handheld optical fiber microscope) to be used to analyze an optical fiber 104 (e.g., by inspecting an image of an end face of the optical fiber 104). As shown, the optical fiber 104 may be disposed within an optical cable 106. The optical cable 106 may include any number of additional optical fibers 104. In some implementations, for example, the optical cable 106 may include a ferrule made from metal, ceramic, high-quality plastic, and/or the like, and the ferrule may have a hollowed-out center that forms a tight grip on the optical fiber 104.

The device 102 may be, for example, a handheld optical fiber microscope configured for inspecting an end face of an optical fiber of an optical cable. As shown, the device 102 may include an opto-mechanical assembly 108. The opto-mechanical assembly 108 may include various components to be used to analyze the end face of the optical fiber 104 (e.g., electronic components, optical components, and/or mechanical components, among other examples). The opto-mechanical assembly 108 may include an imaging device 110 (e.g., a camera) configured to capture a set of images and/or video of an end face of an optical fiber within a field of view of the imaging device 110. For example, the imaging device 110 may capture a set of images and/or video to be analyzed by the device 102 (or another device communicatively connected to device 102) to determine whether the end face of the optical fiber 104 is dirty, damaged, and/or has surface defects, among other examples. In some examples, the device 102 may provide the set of images and/or video to a server or a computing resource (e.g., of a cloud computing environment) to permit the server or the computing resource to perform an analysis of the set of images and/or video. The opto-mechanical assembly 108 may include one or more components configured to move the imagining device and/or another component relative to the optical fiber 104.

The opto-mechanical assembly 108 may include one or more lenses 112, 114 for focusing an image of the optical fiber 104 for capture by the imaging device 110. As further shown in FIG. 1A, the opto-mechanical assembly 108 may include a focus control component 116 for controlling the microscope of the opto-mechanical assembly 108. The focus control component 116 may include one or more mechanical components for manually adjusting the focus of the image, such as a focus control wheel that can be manually rotated or otherwise operated to adjust the focus in a field of view by moving the lens 112 and/or the lens 114 (and/or any other lenses) relative to the imaging device 110 and/or the optical fiber 104 (e.g., by moving the lens 112 and/or 114 in a side-to-side direction, by moving the lens 112 and/or 114 in an up-and-down direction, by moving the lens 112 and/or 114 closer to the optical fiber 104, and/or by moving the lens 112 and/or 114 further from the optical fiber 104, among other examples. Additionally, or alternatively, the focus control component 116 may include a focus ring, a knob, a button, and/or other suitable components that can be manually actuated or manually operated to adjust the focus in the field of view.

As further shown in FIG. 1A, the device 102 may include an image analysis component 118 for performing a test to analyze images and/or video captured using the imaging device 110. For example, the image analysis component 118 may analyze one or more images of an end face of the optical fiber 104 that are captured using the imaging device 110 to determine whether the end face of the optical fiber 104 complies with a set of criteria that relates to cleanliness and damage. For example, the set of criteria may include pass/fail requirements for connector end face quality for different types of fiber connectors (e.g., Single-Mode Physical Contact (SM-PC) connectors, Single-Mode Ultra Physical Contact (SM-UPC) connectors, Single-Mode Angled Physical Contact (SM-APC) connectors, Multi-Mode (MM) connectors, and/or multi-fiber connectors, among other examples). In some implementations, the image analysis component 118 may analyze various regions or zones within the image(s) to determine whether the image(s) include one or more features that indicate that the end face of the optical fiber 104 is dirty or damaged, and may generate a pass result or a fail result (e.g., based on one or more industry standards, such as International Electrotechnical Commission (IEC) Standard 61300-3-35).

The device 102 may include an inspection tip 120 (referred to herein as a "changeable tip") configured to interface with the end face of the optical fiber 104. As shown, the changeable tip 120 may include one or more programmable components 122 disposed therein. The one or more programmable components 122 may include, for example, a PCB and/or a programmable memory component. In some implementations, the one or more programmable components 122 may include one or more light sources 124 such as, for example, one or more light emitting diodes (LEDs). In some implementations, the one or more programmable components 122 may include any number of different components configured to facilitate providing tip configuration information associated with the changeable tip 120 to a configuration component 126 of the opto-mechanical assembly 108.

In operation, the configuration component 126 may receive, from the one or more programmable components 122 disposed in the changeable tip 120, a signal indicating tip configuration information associated with the changeable tip 120. The tip configuration information may be associated with a magnification level, an expected lighting intensity, field inconsistency from the mechanical configuration (e.g. shadowed or vignetted areas that should be ignored), a mechanical stability of a connection to the tip and/or the optical fiber (e.g., which may suggest a faster or slower image capture speed), image mirroring, customer specific data (e.g., job information, a technical identifier, a customer and/or equipment profile, or a location, among other examples), parameters or calibrations that might be used to correct any expected optical distortion, and/or other issues or specific calibrations created during time of manufacture, among other examples.

The configuration component 126 may configure, based on the tip configuration information, at least one testing parameter associated with a test to inspect the image of the end face of the optical fiber 104 for compliance with a set of criteria related to a condition of the end face of the optical fiber. The at least one testing parameter may include, for example, a sampling rate, a magnification, a mirror position, a mirror orientation, an exposure time (associated with an imaging device), and/or a processing algorithm, among other examples. As an example, a first changeable tip 120 may include a first optical path and a second changeable tip 120 may include a second optical path that is different from the first optical path. Accordingly, tip configuration information provided by the first changeable tip 120 may cause the configuration component 126 to configure a first exposure time associated with the imaging device 110. The tip configuration information provided by the second changeable tip 120 may cause the configuration component 126 to configure a second exposure time associated with the imaging device 110, where the second exposure time is configured to facilitate a more effective image capture associated with the second optical path than the first exposure time. Any number of other testing parameters may be configured based on tip configuration information to facilitate more effective imaging and testing operations associated with the changeable tip.

The changeable tip 120 may be coupled to the opto-mechanical assembly 108 via a tip connection interface 128. The tip connection interface 128 may provide a mechanical connection between the changeable tip 120 and the opto-mechanical assembly 108. The tip connection interface 128 also may provide an electrical connection between the changeable tip 120 and the opto-mechanical assembly 108. The electrical connection may facilitate communication of the tip configuration information to the configuration component 126.

In some implementations, as shown in FIG. 1B, the tip connection interface 128 may further include a coupling mechanism 130 that is used to provide an electrical connection between the changeable tip 120 and the opto-electrical assembly 108. The coupling mechanism may include one or more electrical contacts 132, each of which may be slidably disposed within a contact housing 134. A spring 136 disposed between the electrical contact 132 and an end of the contact housing 134 may facilitate spring-loading the electrical contact 132, thereby facilitating engagement with an electrical contact 138 of the changeable tip 120. For example, in some implementations, the changeable tip 120 includes a first electrical contact 138 configured to engage a second electrical contact 132 of a tip connection interface 128 disposed on an opto-mechanical assembly 108 of the device 102 when the changeable tip 120 is coupled to the opto-mechanical assembly 108. Electrical conductors 140 (e.g., wires, traces, and/or leads, among other examples) may provide electrical and/or communicative connection between the changeable tip 120 and the configuration component 118.

As indicated above, FIGS. 1A and 1B are provided merely as one or more examples. Other examples may differ from what is described with regard to FIGS. 1A and 1B. In practice, there may be additional components, fewer components, different components, or differently arranged components than those shown in FIGS. 1A and 1B.

Figure 2:
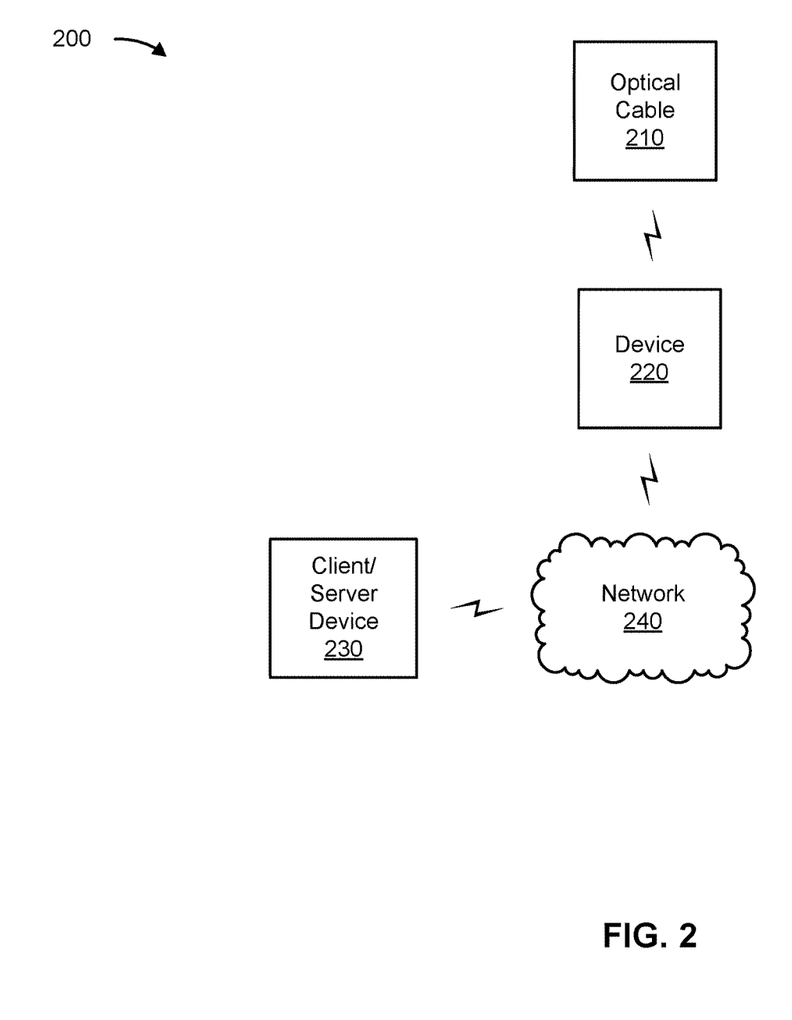
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an optical cable 210, a device 220, a client device or a server device (hereinafter referred to as client/server device 230), and a network 240. Devices of environment 200 may interconnect via wired connections, wireless connections, or a combination of wired and wireless connections.

Optical cable 210 includes a cable containing one or more optical fibers that are used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein. Additionally, or alternatively, optical cable 210 may include one or more optical fibers that have an end face to be analyzed by device 220 for cleanliness, damage, surface defects, and/or the like, as described elsewhere herein.

Device 220 includes one or more devices capable of capturing, receiving, storing, generating, processing, and/or providing information related to an automatic analysis of an end face of an optical fiber of optical cable 210. For example, device 220 may include an optical probe, an optical fiber microscope, a fault locator, an optical fiber inspection microscope, and/or a similar type of device. In some implementations, device 220 may automatically initiate a test to inspect or otherwise analyze an end face of an optical fiber of optical cable 210 when an image of the end face is manually focused, as described in further detail elsewhere herein. For example, device 220 may include an opto-mechanical assembly having one or more components for manually focusing the image of the end face of the optical fiber of optical cable 210, and device 220 may monitor a focus metric associated with the image while the image is manually focused using the opto-mechanical assembly. Accordingly, device 220 may automatically initiate the test to inspect the image for compliance with a set of criteria related to cleanliness and damage (e.g., ensuring that the end face of the optical fiber of optical cable 210 is free from dust particles, dirt particles, scratches, and/or other surface defects) when the focus metric satisfies a condition. Additionally, or alternatively, device 220 may provide a result of the test for display (e.g., via a display of device 220, a display of client/server device 230, and/or the like), as described elsewhere herein.

Client/server device 230 includes one or more devices capable of receiving, generating, storing, processing, and/or providing information associated with an automatic analysis of an end face of an optical fiber of optical cable 210. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive information related to an analysis of optical cable 210 from device 220, as described elsewhere herein. Additionally, or alternatively, client/server device 230 may provide a result of an analysis of optical cable 210 for display, as described elsewhere herein. In some implementations, client/server device 230 may be associated with a cloud computing environment. In some implementations, client/server device 230 may receive a set of images, video, and/or data from device 220 and may perform an analysis of an end face of an optical fiber using the set of images, the video, and/or the data.

Network 240 includes one or more wired and/or wireless networks. For example, network 240 may include a wired network. As another example, network 240 may include a cellular network (e.g., a long-term evolution (LTE) network, a code division multiple access (CDMA) network, a 3G network, a 4G network, a 5G network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
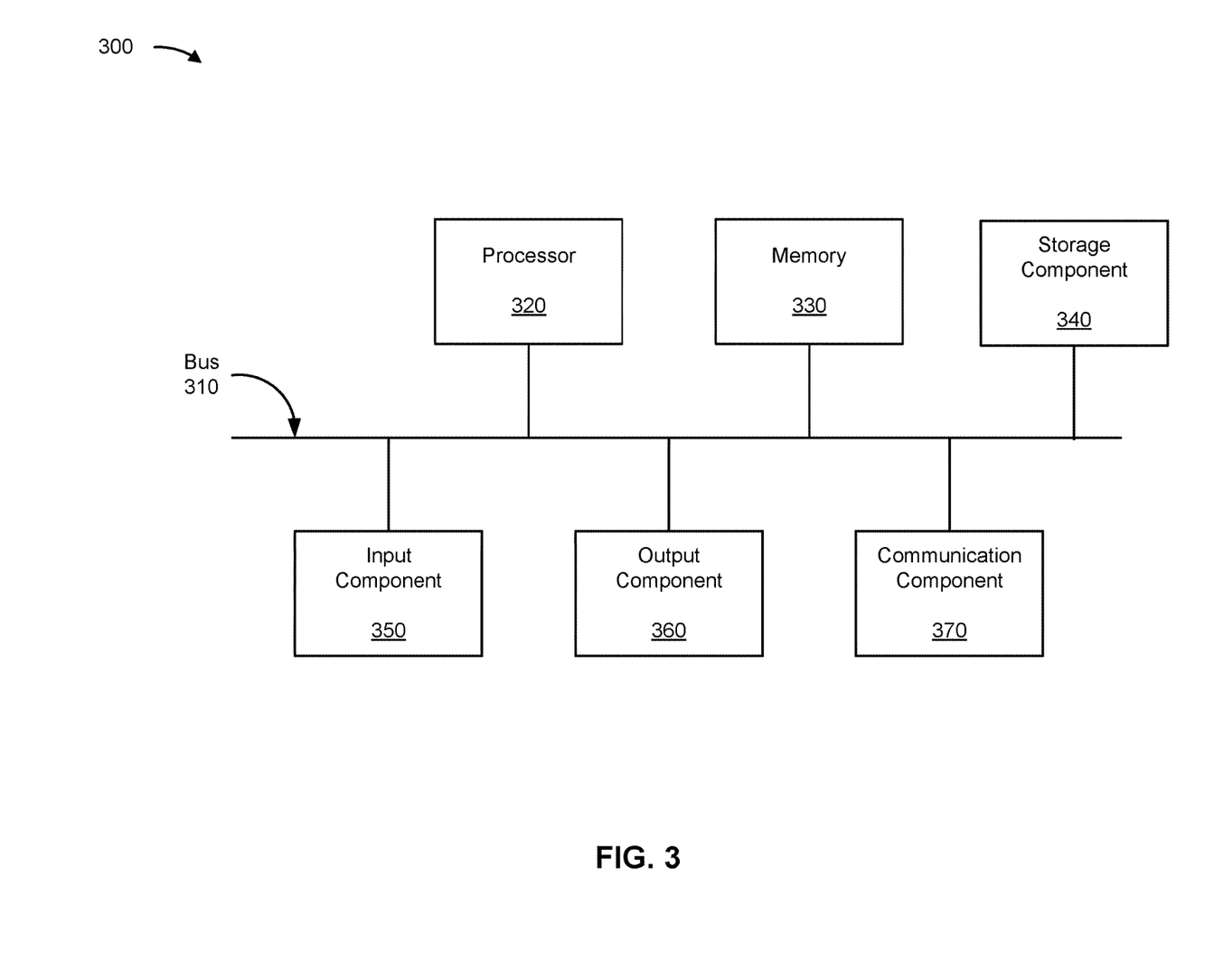
FIG. 3 is a diagram of example components of a device.

FIG. 3 is a diagram of example components of a device 300. Device 300 may correspond to device 220 and/or client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320. In some implementations, the processor 320 may be two or more processors.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330. In some implementations, the memory 330 may be two or more memories.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive. In some implementations, storage component 340 may be two or more storage components.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication component 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication component 370 may permit device 300 to receive information from another device and/or provide information to another device. For example, communication component 370 may include an Ethernet interface, an optical interface, a coaxial interface, an infrared interface, a radio frequency (RF) interface, a universal serial bus (USB) interface, a Wi-Fi interface, and/or a cellular network interface, among other examples.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
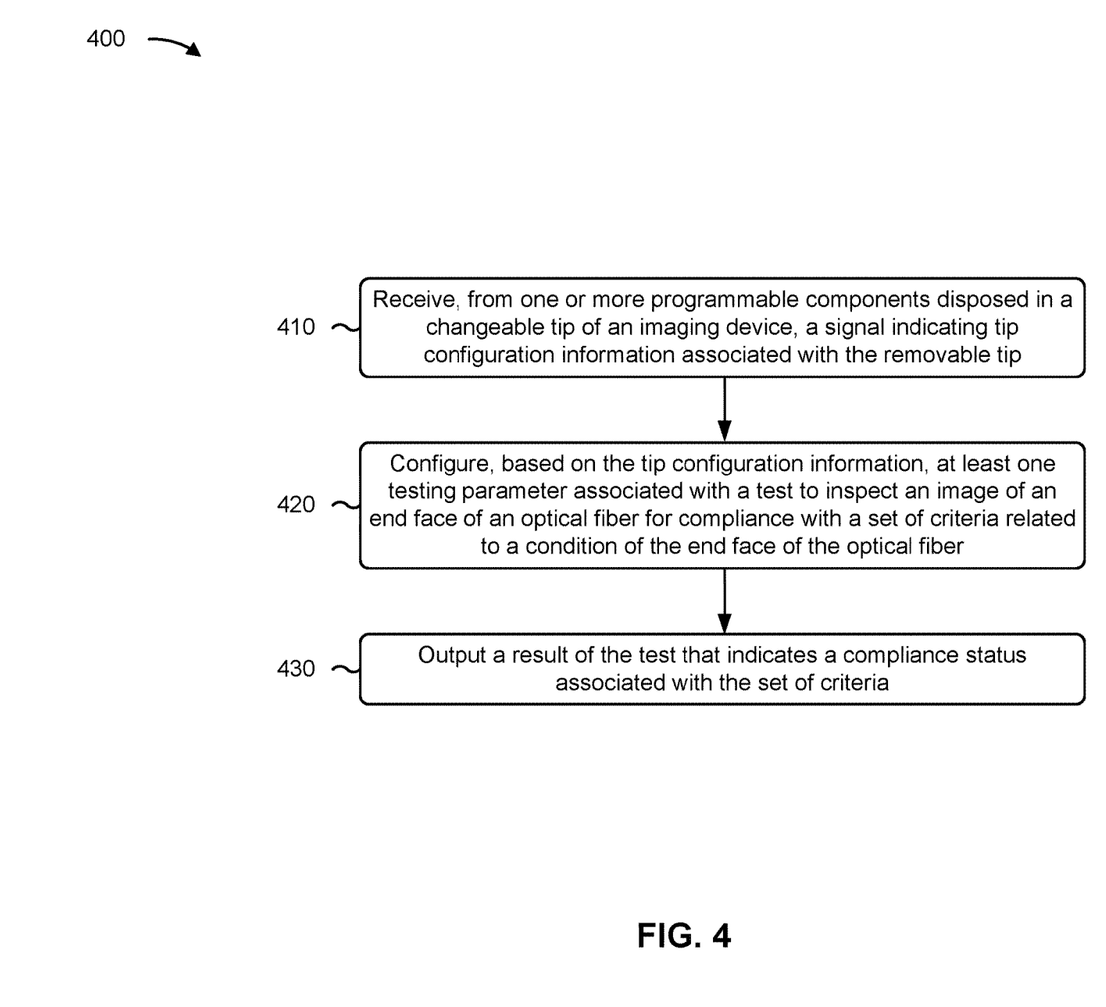
FIG. 4 is a flowchart of an example process associated with using a device having a changeable tip for inspecting an optical fiber.

FIG. 4 is a flowchart of an example process 400 associated with using a device having a changeable tip for inspecting an optical fiber. In some implementations, one or more process blocks of FIG. 4 are performed by a device (e.g., device 300). In some implementations, one or more process blocks of FIG. 4 are performed by another device or a group of devices separate from or including the device, such as a client and/or server device (e.g., client/server device 230). Additionally, or alternatively, one or more process blocks of FIG. 4 may be performed by one or more components of device 300, such as processor 320, memory 330, storage component 340, input component 350, output component 350, and/or communication component 360.

As shown in FIG. 4, process 400 may include receiving, from one or more programmable components disposed in a changeable tip of an imaging device, a signal indicating tip configuration information associated with the removable tip (block 410). For example, the device may receive, from one or more programmable components disposed in a changeable tip of an imaging device, a signal indicating tip configuration information associated with the removable tip, as described above.

As further shown in FIG. 4, process 400 may include configuring, based on the tip configuration information, at least one testing parameter associated with a test to inspect an image of an end face of an optical fiber for compliance with a set of criteria related to a condition of the end face of the optical fiber (block 420). For example, the device may activate software that causes one or more processors to configure, based on the tip configuration information, at least one testing parameter associated with a test to inspect an image of an end face of an optical fiber for compliance with a set of criteria related to a condition of the end face of the optical fiber, as described above.

As further shown in FIG. 4, process 400 may include outputting a result of the test that indicates a compliance status associated with the set of criteria (block 430). For example, the device may output a result of the test that indicates a compliance status associated with the set of criteria, as described above.

Process 400 may include additional implementations, such as any single implementation or any combination of implementations described below and/or in connection with one or more other processes described elsewhere herein.

In a first implementation, the one or more programmable components comprise a PCB. In a second implementation, alone or in combination with the first implementation, the one or more programmable components comprise a programmable memory component. In a third implementation, alone or in combination with one or more of the first and second implementations, the one or more programmable components comprise an LED.

In a fourth implementation, alone or in combination with one or more of the first through third implementations, the changeable tip includes a first electrical contact configured to engage a second electrical contact of a tip connection interface disposed on an opto-mechanical assembly of the imaging device when the changeable tip is coupled to the opto-mechanical assembly. In a fifth implementation, alone or in combination with the fourth implementation, at least one of the first electrical contact or the second electrical contact includes a spring-loaded contact element.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   an opto-mechanical assembly comprising an imaging device configured to capture an image of an end face of an optical fiber within a field of view of the imaging device;
   a changeable tip removably coupled to the opto-mechanical assembly and having one or more programmable components disposed therein, wherein the changeable tip comprises a first electrical contact;
   a tip connection interface, between the opto-mechanical assembly and the changeable tip, comprising a second electrical contact configured to engage the first electrical contact when the changeable tip is coupled to the opto-mechanical assembly;
   one or more memories disposed in the opto-mechanical assembly; and
   one or more processors, disposed in the opto-mechanical assembly and coupled to the one or more memories, configured to:
      receive, from the one or more programmable components disposed in the changeable tip, a signal indicating tip configuration information associated with the changeable tip,
      configure, based on the tip configuration information, at least one testing parameter associated with a test to inspect the image of the end face of the optical fiber for compliance with a set of criteria related to a condition of the end face of the optical fiber, and
      output a result of the test that indicates a compliance status associated with the set of criteria.

2. The device of claim 1,
   wherein the one or more programmable components comprise a printed circuit board (PCB).

3. The device of claim 1,
   wherein the one or more programmable components comprise a programmable memory component.

4. The device of claim 1,
   wherein the one or more programmable components comprise a light emitting diode (LED).

5. The device of claim 1,
   wherein at least one of the first electrical contact or the second electrical contact comprises a spring-loaded contact element.

6. The device of claim 1, wherein the opto-mechanical assembly and the changeable tip reside on opposite sides of the tip connection interface.

7. The device of claim 5, wherein the spring-loaded contact element comprises a contact housing and a spring.

8. A method, comprising:
   receiving, from one or more programmable components disposed in a changeable tip of an imaging device, a signal indicating tip configuration information associated with the changeable tip, wherein the changeable tip comprises a first electrical contact configured to engage a second electrical contact of a tip connection interface disposed on an opto-mechanical assembly of the imaging device when the changeable tip is coupled to the opto-mechanical assembly;
   configuring, based on the tip configuration information, at least one testing parameter associated with a test to inspect an image of an end face of an optical fiber for compliance with a set of criteria related to a condition of the end face of the optical fiber; and
   outputting a result of the test that indicates a compliance status associated with the set of criteria.

9. The method of claim 8,
   wherein the one or more programmable components comprise a printed circuit board (PCB).

10. The method of claim 8,
    wherein the one or more programmable components comprise a programmable memory component.

11. The method of claim 8,
    wherein the one or more programmable components comprise a light emitting diode (LED).

12. The method of claim 8,
    wherein at least one of the first electrical contact or the second electrical contact comprises a spring-loaded contact element.

13. The method of claim 12, wherein the spring-loaded contact element comprises a contact housing and a spring.

14. The method of claim 8, wherein the opto-mechanical assembly and the changeable tip are on opposite sides of the tip connection interface.

15. A device, comprising:
    a tip connection interface, comprising a first electrical contact configured to engage a second electrical contact of a changeable tip, configured to cause a signal indicating tip configuration information associated with the changeable tip to be transmitted; and
    an opto-mechanical assembly, connected to the tip connection interface, comprising:
       an imaging device configured to capture an image of an end face of an optical fiber within a field of view of the imaging device, and
       a configuration component configured to:
          receive, from one or more programmable components of the changeable tip, a signal indicating tip configuration information associated with the changeable tip,
          configure, based on the tip configuration information, at least one testing parameter associated with a test to inspect the image of the end face of the optical fiber for compliance with a set of criteria related to a condition of the end face of the optical fiber, and
          output a result of the test that indicates a compliance status associated with the set of criteria.

16. The device of claim 15,
    wherein the at least one testing parameter comprises one or more of: a sampling rate, a magnification, a mirror position, a mirror orientation, an exposure time, or a processing algorithm.

17. The device of claim 15,
    wherein the tip configuration information is associated with one or more of:
       a magnification level,
       an expected lighting intensity,
       a field inconsistency,
       a mechanical stability of a connection to the changeable tip,
       image mirroring,
       customer specific data, or
       a parameter or a calibration associated with correcting an expected optical distortion or an issues or a calibration created during a time of manufacture.

18. The device of claim 15,
    wherein the tip connection interface is configured to cause the signal indicating tip configuration information associated with the changeable tip to be transmitted from the one or more programmable components of the changeable tip.

19. The device of claim 15,
wherein at least one of the first electrical contact or the second electrical contact comprises a spring-loaded contact element.

20. The device of claim 19,
wherein the spring-loaded contact element comprises a contact housing and a spring.

\* \* \* \* \*